United States Patent
Suzuki et al.

(10) Patent No.: US 10,020,925 B2
(45) Date of Patent: *Jul. 10, 2018

(54) METHOD AND SYSTEM FOR DYNAMIC ACK/NACK REPETITION FOR ROBUST DOWNLINK MAC PDU TRANSMISSION IN LTE

(71) Applicant: BlackBerry Limited, Waterloo (CA)

(72) Inventors: Takashi Suzuki, Ichikawa (JP); Zhijun Cai, Ashburn, VA (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,441

(22) Filed: Jan. 29, 2015

(65) Prior Publication Data

US 2015/0180637 A1 Jun. 25, 2015

Related U.S. Application Data

(63) Continuation of application No. 14/156,734, filed on Jan. 16, 2014, now Pat. No. 8,976,737, which is a
(Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1858* (2013.01); *H04L 5/0053* (2013.01);
(Continued)

(58) Field of Classification Search
CPC ... H04L 1/1858; H04L 5/0005; H04L 5/0053; H04L 5/0055; H04L 5/0092; H04L 2001/125; H04L 5/0064; H04W 28/04
(Continued)

(56) References Cited

U.S. PATENT DOCUMENTS 6,778,509 B1 8/2004 Ravishankar et al.
7,128,270 B2 10/2006 Silverbrook et al.
(Continued)

FOREIGN PATENT DOCUMENTS

KR 1020000025436 5/2000
WO 2096006 11/2002
(Continued)

OTHER PUBLICATIONS

3GPP TS 25.214 v7.4.0 (Mar. 2007), 3rd Generation Partnership Project; Technical Specification Group Radio Access Network; "Physical layer procedures (FOO) (Release 7)".
(Continued)

*Primary Examiner* — Raj Jain
*Assistant Examiner* — Andrew C Lee
(74) *Attorney, Agent, or Firm* — Fish & Richardson P.C.

(57) ABSTRACT

A method and apparatus for dynamic acknowledgement repetition for a downlink medium access control packet data unit transmission 'MAC PDU' requiring multiple acknowledgements, the method having the steps of: receiving the downlink MAC PDU requiring multiple acknowledgements; and utilizing a differentiating factor and acknowledgement scheme, sending the multiple acknowledgements.

14 Claims, 12 Drawing Sheets

Related U.S. Application Data continuation of application No. 13/476,713, filed on May 21, 2012, now Pat. No. 8,665,796, which is a continuation of application No. 11/862,679, filed on Sep. 27, 2007, now Pat. No. 8,204,010.

(60) Provisional application No. 60/944,644, filed on Jun. 18, 2007.

(51) Int. Cl.
  *H04L 1/12* (2006.01)
  *H04W 28/04* (2009.01)

(52) U.S. Cl.
  CPC .......... *H04L 5/0005* (2013.01); *H04L 5/0064* (2013.01); *H04L 5/0092* (2013.01); *H04L 2001/125* (2013.01); *H04W 28/04* (2013.01)

(58) Field of Classification Search
  USPC ........................................................ 370/329
  See application file for complete search history.

(56) References Cited

U.S. PATENT DOCUMENTS

| | | | |
|---|---|---|---|
| 7,181,667 B2 | 2/2007 | Argyropoulos et al. | |
| 7,263,371 B2 | 8/2007 | Das et al. | |
| 7,272,396 B2 | 9/2007 | Obuchi et al. | |
| 7,408,913 B2 | 8/2008 | Khan | |
| 7,414,985 B1* | 8/2008 | Tedijanto | H04L 45/245 370/236 |
| 7,436,857 B2 | 10/2008 | Fong et al. | |
| 7,496,079 B2 | 2/2009 | Kim et al. | |
| 7,499,437 B2 | 3/2009 | Das et al. | |
| 7,502,597 B2 | 3/2009 | Murata et al. | |
| 7,526,304 B2 | 4/2009 | Bachl et al. | |
| 7,567,536 B2 | 7/2009 | Czaja et al. | |
| 7,570,916 B2 | 8/2009 | Xiao et al. | |
| 7,653,026 B2 | 1/2010 | Obuchi et al. | |
| 7,668,188 B2 | 2/2010 | Chang et al. | |
| 7,673,211 B2* | 3/2010 | Meyer | H04L 1/1607 714/748 |
| 7,676,223 B2 | 3/2010 | Das et al. | |
| 7,689,178 B2 | 3/2010 | Parkvall et al. | |
| 7,720,504 B2 | 5/2010 | Murata et al. | |
| 7,738,369 B2 | 5/2010 | Carmon et al. | |
| 7,738,418 B2 | 6/2010 | Kwon et al. | |
| 7,764,707 B2 | 7/2010 | Li | |
| 7,782,817 B2 | 8/2010 | Yang et al. | |
| 7,822,044 B2 | 10/2010 | Lee et al. | |
| 7,839,828 B2 | 11/2010 | Wang et al. | |
| 7,940,737 B2 | 5/2011 | Yoon et al. | |
| 7,948,932 B2 | 5/2011 | Murata et al. | |
| 8,068,457 B2 | 11/2011 | Pi et al. | |
| 8,102,802 B2* | 1/2012 | Ratasuk | H04J 11/005 370/329 |
| 8,116,250 B2 | 2/2012 | Lindskog et al. | |
| 8,204,010 B2 | 6/2012 | Suzuki et al. | |
| 8,478,285 B2 | 7/2013 | Iwamura et al. | |
| 8,498,228 B2 | 7/2013 | Lee et al. | |
| 8,665,796 B2 | 3/2014 | Suzuki et al. | |
| 8,693,428 B2* | 4/2014 | Kishiyama | H04B 1/59 370/329 |
| 2003/0076783 A1 | 4/2003 | Das et al. | |
| 2004/0009767 A1 | 1/2004 | Lee et al. | |
| 2004/0013102 A1 | 1/2004 | Fong et al. | |
| 2004/0179493 A1 | 9/2004 | Khan | |
| 2004/0228320 A1 | 11/2004 | Laroia et al. | |
| 2004/0240400 A1 | 12/2004 | Khan | |
| 2005/0085197 A1 | 4/2005 | Laroia et al. | |
| 2006/0003702 A1 | 1/2006 | Nibe et al. | |
| 2006/0019672 A1 | 1/2006 | Kolding et al. | |
| 2006/0057965 A1 | 3/2006 | Braun et al. | |
| 2006/0077923 A1 | 4/2006 | Niwano | |
| 2006/0111100 A1 | 5/2006 | Murata et al. | |
| 2006/0120403 A1 | 6/2006 | Murata et al. | |
| 2006/0209870 A1 | 9/2006 | Lee et al. | |
| 2006/0221888 A1 | 10/2006 | Sebire et al. | |
| 2006/0251015 A1* | 11/2006 | Khan | H04L 1/1607 370/329 |
| 2006/0282739 A1 | 12/2006 | Meyer et al. | |
| 2007/0133458 A1 | 6/2007 | Chandra et al. | |
| 2007/0171849 A1* | 7/2007 | Zhang | H04L 1/0026 370/310 |
| 2007/0171995 A1* | 7/2007 | Muharemovic | H04B 1/707 375/260 |
| 2007/0223469 A1 | 9/2007 | Chandra et al. | |
| 2007/0223614 A1 | 9/2007 | Kuchibhotla et al. | |
| 2007/0230479 A1 | 10/2007 | Liu et al. | |
| 2007/0230600 A1* | 10/2007 | Bertrand | H04J 13/00 375/260 |
| 2007/0258540 A1* | 11/2007 | Ratasuk | H04J 11/005 375/267 |
| 2008/0037474 A1* | 2/2008 | Niwano | H04W 72/1268 370/335 |
| 2008/0049749 A1 | 2/2008 | Xiao et al. | |
| 2008/0095109 A1* | 4/2008 | Malladi | H04L 1/1858 370/330 |
| 2008/0095223 A1* | 4/2008 | Tong | H04L 1/0026 375/228 |
| 2008/0123595 A1 | 5/2008 | Lindheimer et al. | |
| 2008/0167089 A1* | 7/2008 | Suzuki | H04L 1/1829 455/574 |
| 2008/0186944 A1* | 8/2008 | Suzuki | H04L 1/1685 370/349 |
| 2008/0192703 A1* | 8/2008 | Suzuki | H04W 76/048 370/335 |
| 2008/0225791 A1 | 9/2008 | Pi et al. | |
| 2008/0259863 A1 | 10/2008 | Zhang et al. | |
| 2008/0268785 A1 | 10/2008 | McCoy et al. | |
| 2008/0310338 A1 | 12/2008 | Charpenter et al. | |
| 2008/0310540 A1* | 12/2008 | Tiirola | H04J 13/00 375/267 |
| 2009/0003305 A1 | 1/2009 | Gerstenberger et al. | |
| 2009/0022098 A1* | 1/2009 | Novak | H04L 1/14 370/329 |
| 2009/0046793 A1 | 2/2009 | Love et al. | |
| 2009/0168704 A1 | 7/2009 | Lee et al. | |
| 2009/0181689 A1 | 7/2009 | Lee et al. | |
| 2009/0196239 A1* | 8/2009 | Lee | H04L 1/1671 370/329 |
| 2009/0207771 A1 | 8/2009 | Lindskog et al. | |
| 2009/0213813 A1* | 8/2009 | Futagi | H04J 13/0059 370/335 |
| 2009/0274100 A1 | 11/2009 | Montojo et al. | |
| 2009/0276672 A1 | 11/2009 | Lee et al. | |
| 2009/0310534 A1 | 12/2009 | Lindskog et al. | |
| 2010/0091755 A1* | 4/2010 | Kwon | H04L 5/0007 370/344 |
| 2010/0113054 A1 | 5/2010 | Iwamura et al. | |
| 2010/0325502 A1 | 12/2010 | Lindskog et al. | |
| 2010/0325508 A1 | 12/2010 | Hu et al. | |
| 2011/0113299 A1 | 5/2011 | Power et al. | |
| 2011/0176502 A1 | 7/2011 | Chung et al. | |
| 2011/0280203 A1 | 11/2011 | Han et al. | |
| 2011/0292900 A1 | 12/2011 | Ahn et al. | |
| 2013/0114577 A1 | 5/2013 | Cai et al. | |
| 2014/0126493 A1 | 5/2014 | Fan et al. | |

FOREIGN PATENT DOCUMENTS

| | | |
|---|---|---|
| WO | 3096298 | 11/2003 |
| WO | 2004091129 | 10/2004 |
| WO | 2005046125 | 5/2005 |
| WO | 2005119959 | 12/2005 |
| WO | 2007050231 | 5/2007 |

(56) References Cited

FOREIGN PATENT DOCUMENTS

| WO | 2007063393 | 6/2007 |
|----|------------|--------|
| WO | 2008028006 | 6/2008 |

OTHER PUBLICATIONS

NTT DoCoMo et al., Repetition of ACK/NACK in E-UTRA Uplink, Jan. 15-19, 2007, 3GPP TSG RAN WGI Meeting #47bis, Sorrento, Italy (6 pages).
Research in Motion, Dynamic ACK/NACK Repetition, Jun. 25-29, 2007, 3GPP TSG RAN WG2 Meeting #58bis (3 pages).
"3rd Generation Partnership Project, 3GPP TR 25.813 v7.1.0—Technical Specification Group Radio Access Network; Evolved Universal Terrestrial Radio Access (E-UTRA) and Evolved Universal Terrestrial Radio Access Network (E- UTRAN); Radio interface protocol aspects (Release 7), Sep. 2006 (41 pages)".
NTT DoCoMo, Implicit Resource Allocation of ACK/NACK Signal in E-UTRA Uplink, May 7-11, 2007, 3GPP TSG RAN WG1 Meeting #49, Kobe Japan (3 pages).
3rd Generation Partnership Project, 3GPP TR 36.213 v8.0.0—Technical Specification Group Radio Access Network; Evolved Universal Terrestrial Radio Access (E-UTRA) and Evolved Universal Terrestrial Radio Access Network (E-UTRAN); Physical layer procedures (Release 8), Sep. 2007 (13 pages).
NTT DoCoMo, Sharp, Toshiba Corporation, "Data—non-associated L 1/L2 Control Channel Structure for E-UTRA Uplink," 3GPP TSG RAN WG1 LT E Ad Hoc, 3GPP, Jun. 27-30, 2006.
PCT Application No. PCT/CA2007/001728, International Search Report and Written Opinion dated Mar. 26, 2008.
International Preliminary Report on Patentability issued in International Application No. PCT/CA2007/001728, dated Dec. 22, 2009, 6 pages.
Office Action, dated Dec. 13, 2012, in corresponding Australian Application No. 2007355416 (2 pages).
Examiner's First Report on Australian Patent Application No. 2007355416, dated Aug. 12, 2010, from the Australian Patent Office (1 page).
Examiner's Second Report on Australian Patent No. 2007355416, dated Dec. 21, 2010, from the Australian Patent Office.
Office Action, dated Oct. 10, 2012, in corresponding Canadian Application No. 2,691, 139 (2 pages).
Notice of Allowance issued in CA Application No. 2,691, 139, dated Oct. 31, 2013, 1 page.
Office Action, dated Jan. 11, 2012, in corresponding Chinese Application No. 200780053703.9 (9 pages)—With English Translation.
Office Action, dated Jul. 24, 2012, in corresponding Chinese Application No. 200780053703.0, and English translation (9 pages).
Office Action, dated Feb. 6, 2013, in corresponding Chinese Application No. 200780053703.9 (6 pages).—With English Translation.
Notice of Allowance issued in CN Application No. 200780053703.0, dated Aug. 9, 2013, 4 pages.
European Search Report for International Application No. PCT/CA07/001728, dated Oct. 6, 2010 (10 pages).
Office Action, dated Oct. 9, 2012, in corresponding European Application No. 07815916.7-2415 (7 pages).
Extended European Search Report from the European Patent Office in Application No. 13168080.3-1860, dated Jul. 30, 2013 (references cited therein previously made of record) (6 pages).
Decision to Grant issued in EP Application No. 07815916.7, dated Jun. 27, 2013, 2 pages.
Decision to Grant issued in EP Application No. 13168080.3, dated Jun. 5, 2014, 2 pages.
Office Action, dated Dec. 26, 2012, in corresponding Korean Application No. 10-2011-7011956 (7 pages).
Office Action, dated Aug. 19, 2011, in corresponding Korean Application No. 10-2011-7011956.
Office Action, dated Sep. 7, 2012, in corresponding Korean Application No. 10-2011-7024700, and English translation (6 pages).
Office Action, dated Oct. 29, 2012, in corresponding Korean Application No. 10-2010-7001024, and English translation (8 pages).
Notice of Allowance of Patent from the Korean Intellectual Property Office in Application No. 10-2010-7001024, dated Jul. 25, 2013 (3 pages).
Notice of Decision for Patent issued in KR Application No. 10-2011-7011956, dated Mar. 27, 2012, 3 pages.
Notice of Alllowance issued in KR Application No. 10-2011-7024700, dated Dec. 27, 2012, 3 pages.
Office Action issued in KR Application No. 10-2010-7001024, dated Mar. 25, 2011, 7 pages.
Notice of Final Rejection issued in KR Application No. 10-2010-7001024, dated May 14, 2013, 6 pages.
Office Action, dated Feb. 6, 2012, in corresponding Japanese Application No. 2010-512468 (9 pages).
Office Action, dated Jun. 26, 2012, in corresponding Japanese Application No. 2010-512468, and English translation (6 pages).
Office Action, dated Feb. 6, 2013, in corresponding Japanese Application No. 2010-512468 (10 pages).
Office Action from the Japan Patent Office in Application No. 2010-512468, dated Aug. 21, 2013 (18 pages).
Office Action issued in JP Application No. 2010-512468, dated Mar. 12, 2014, 4 pages.
NOA and Decision of Appeals issued in JP Application No. 2010-512468, dated Dec. 26, 2013, 2 pages.
Non-final Office Action issued in U.S. Appl. No. 11/862,679, dated Sep. 30, 2010, 11 pages.
Final Office Action issued in U.S. Appl. No. 11/862,679, dated May 26, 2011, 14 pages.
Final Office Action issued in U.S. Appl. No. 11/862,679, dated Jan. 11, 2012, 22 pages.
Notice of Allowance issued in U.S. Appl. No. 11/862,679, dated Mar. 14, 2012, 16 pages.
Non-final Office Action issued in U.S. Appl. No. 13/476,713, dated Apr. 15, 2013, 48 pages.
Final Office Action issued in U.S. Appl. No. 13/476,713, dated Aug. 9, 2013, 37 pages.
Notice of Allowance issued in U.S. Appl. No. 13/476,713, dated Oct. 21, 2013, 16 pages.
3GPP TS 25.214 V7.1.0 (Jun. 2006); 3rd Generation Partnership Project; Technical Specification Group Radio Access Network; Physical layer procedures (FDD) (Release 7).
Office Action issued in Indian Application No. 8283/DELNP/2009 dated May 31, 2016.

\* cited by examiner

METHOD AND SYSTEM FOR DYNAMIC ACK/NACK REPETITION FOR ROBUST DOWNLINK MAC PDU TRANSMISSION IN LTE

CROSS-REFERENCE TO RELATED APPLICATIONS

This application is a continuation of and claims priority from U.S. patent application Ser. No. 14/156,734, filed on Jan. 16, 2014, which is a continuation and claims priority from U.S. patent application Ser. No. 13/476,713, filed May 21, 2012, which is a continuation of and claims priority from U.S. patent application Ser. No. 11/862,679, filed Sep. 27, 2007 and issued as U.S. Pat. No. 8,204,010 on Jun. 19, 2012, which is a non-provisional of and claims priority from U.S. Provisional Application No. 60/944,644, filed Jun. 18, 2007, all of which are incorporated herein by reference.

FIELD OF THE DISCLOSURE

The present disclosure relates to the long-term evolution (LTE) architecture, and in particular to the acknowledgement of medium access control packet data units (MAC PDUs) in a long-term evolution architecture.

BACKGROUND

In the long term evolution infrastructure, one proposal being studied is the use of acknowledgement/negative acknowledgement (ACK/NACK) repetition in order to increase the probability of correct hybrid automatic repeat request (HARQ) feedback signal detection for more important MAC PDUs or in an uplink power limited case. These more important MAC PDUs could, for example, include those containing control information in their body or as part of the header. Discontinuous reception values are one example of control information that could be sent in a MAC PDU.

One problem with multiple acknowledgements/negative acknowledgements, hereinafter referred as multiple acknowledgements is that if messages requiring multiple feedbacks are sent in adjacent time slots, collisions between the acknowledgements may occur and the enhanced Node B could not decode the acknowledgements properly due to the collision. Avoiding adjacent time slots creates latency.

BRIEF DESCRIPTION OF THE DRAWINGS

The present disclosure will be better understood with reference to the drawings in which.

DETAILED DESCRIPTION

Figure 1:
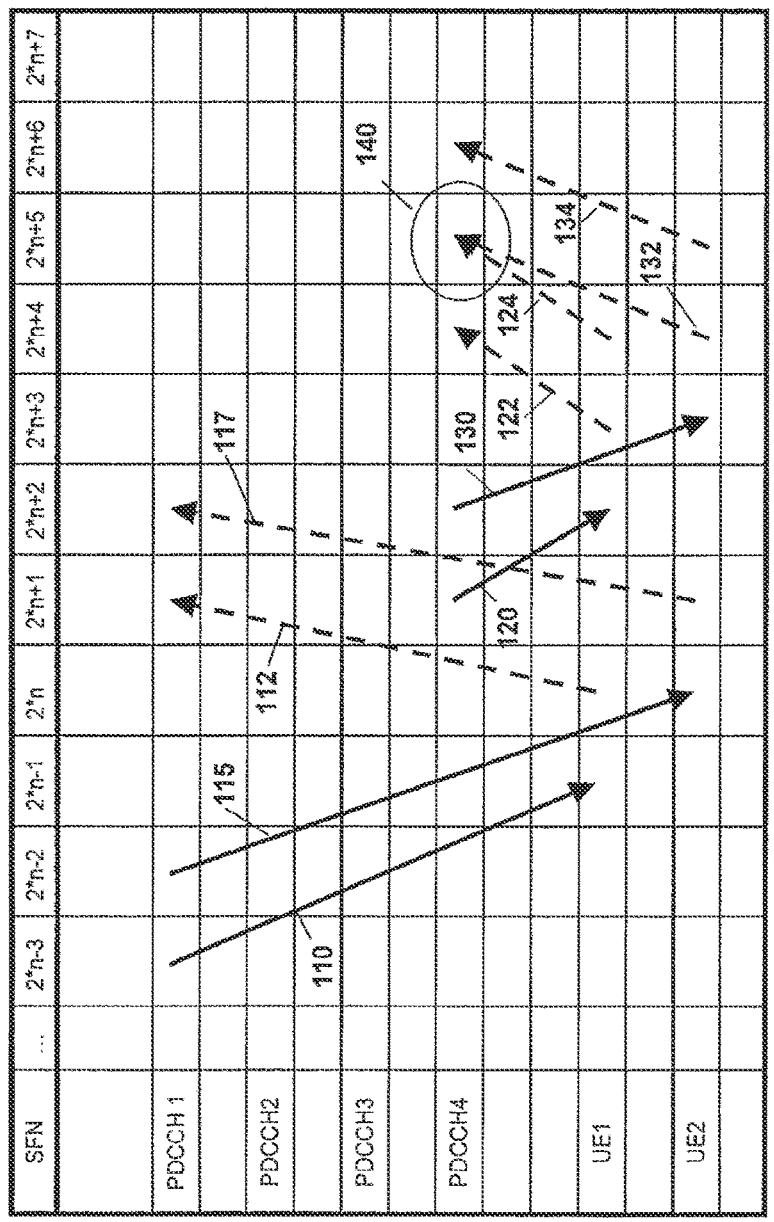
FIG. 1 is a dataflow diagram showing communications between an enhanced node B (eNB) and two user equipments (UEs)

The present disclosure overcomes latency issues and/or minimizes resource utilization by providing for multiple HARQ feedbacks (acknowledgement or negative acknowledgement) using differentiating factors. The differentiating factors allow an eNB to distinguish between multiple HARQ feedbacks received from different UEs in the same time slot.

In a first embodiment, the differentiating factor is the use of multiple physical downlink control channels (PDCCHs) for the indication of messages having robust response requirements. In the case where two acknowledgements are required for the message, two PDCCHs can be assigned and messages sent in an odd time slot can be sent on a first PDCCH and messages sent in an even time slot can be sent in a second PDCCH, thereby avoiding collisions for messages requiring robust feedback sent in adjacent time slots.

In a further embodiment, the differentiating factor is the use of different cyclic shifts of a Constant Amplitude Zero Autocorrelation (CAZAC) sequence to distinguish between feedback messages. Thus, in the case of robust signaling requiring two HARQ feedbacks, feedbacks for messages sent in odd time slots can utilize the first half of the possible cyclic shifts and feedbacks for messages sent in even time slots can utilize a second half of the possible cyclic shifts.

In a further alternative embodiment, frequency blocks can be used as the differentiating factor. Thus, in the case of robust signaling requiring two HARQ feedbacks, feedbacks for messages sent in odd time slots can utilize a first frequency block within a particular channel and feedbacks for messages sent in even time slots can utilize a second frequency block within the particular channel.

In a further embodiment, a hybrid system can be utilized in which differentiating factors can depend on network conditions. Thus, for example, if the network is underutilized, two or more dedicated channels can be used for robust HARQ signaling and feedback, wherein if the network becomes busy, the number of dedicated channels can be reduced based on allocation of cyclic shifts or frequency blocks. The change in the differentiating factor could be signaled to the UEs based on a broadcast channel or a dedicated message to each UE being serviced by the eNB.

In a further embodiment, instead of utilizing the same resource for all HARQ feedbacks for a message, a scheme for progressing through the differentiating factor could be used. Thus, for example, all first feedbacks for messages requiring robust HARQ feedback can utilize a first cyclic shift/first frequency block and all second feedbacks can utilize a second cyclic shift/frequency block.

In a further embodiment, various differentiating features can be combined. Thus, a system may utilize both frequency and cyclic shifting, may utilize multiple PDCCHs and cyclic shifting, or may utilize multiple PDCCHs and frequency shifting. In a further embodiment, all three differentiating factors could be used together.

The present disclosure therefore provides a method for dynamic acknowledgement repetition for a downlink medium access control packet data unit transmission 'MAC PDU' requiring multiple acknowledgements, the method comprising the steps of: receiving the downlink MAC PDU requiring multiple acknowledgements; and utilizing a differentiating factor and acknowledgement scheme, sending the multiple acknowledgements.

The present disclosure further provides a user equipment adapted for dynamic acknowledgement repetition for a downlink medium access control packet data unit transmission 'MAC PDU' requiring multiple acknowledgements, the user equipment characterized by: a communications subsystem adapted to receive the downlink MAC PDU requiring multiple acknowledgements; and a processor adapted to utilize a differentiating factor and acknowledgement scheme to vary the multiple acknowledgements for sending utilizing the communications subsystem.

Reference is now made to FIG. 1. FIG. 1 illustrates a dataflow diagram between an enhanced node B (eNB) and two user equipments (UEs). The eNB includes four physical downlink control channels (PDCCHs), labeled as PDCCH1, PDCCH2, PDCCH3 and PDCCH4. Based on the RAN1 (Radio Access Network 1) working group agreement that for non-persistent scheduling, the ACK/NACK resource is linked to the index of the control channel (i.e. PDCCH) used for scheduling. Based on this, one or more downlink control channels can be reserved for scheduling of important MAC PDUs, which require repetition of HARQ (hybrid automatic repeat request) feedback, e.g., ACK/NACK feedback, from the UE for higher liability.

In the example of FIG. 1, PDCCH1, PDCCH2 and PDCCH3 can be linked to a single ACK/NACK resource, whereas PDCCH4 can be linked to a double ACK/NACK resource.

The assignment of the reserved PDCCHs and the number of repetitions can be broadcast on a broadcast control channel (BCCH), for example.

Utilizing the above structure, the eNB of FIG. 1 will use PDCCH1, PDCCH2 and PDCCH3 to give a scheduling indication to the UE of a normal downlink MAC PDU which requires standard reliability. The example of FIG. 1 uses PDCCH4 to give a scheduling indication to the UE of an important downlink MAC PDU which requires higher reliability. For example, a MAC control PDU or a MAC data PDU with a MAC control header which may include DRX control information. The present disclosure is not meant to be limited to the types of MAC PDUs that require more robust acknowledgement, and this will be appreciated by those skilled in the art. Any MAC PDU determined by the network to require more robust feedback could be scheduled on PDCCH4.

In the example of FIG. 1, a signal 110 is sent from the eNB on PDCCH1 at time slot 2*n−3 and is received by the UE at time slot 2*n−1. Generally each slot or time unit for data transmission in a cell is numbered by the system and the number is referred to as System Frame Number (SFN) hereafter. In case of LTE, the SFN refers to the number implicitly or explicitly assigned to a subframe. The UE1 acknowledges message 110 with acknowledgement 112, which is sent back to the eNB.

A signal 115 is set from PDCCH1 at time slot 2*n−2 and is received at the UE2 at time slot 2*n. Message 115 is acknowledged in message 117, which is sent back from UE2 to the eNB.

A problem occurs when robust signaling requires multiple acknowledgements. For example, if an important MAC PDU is scheduled for UE1 at time slot 2*n+1, as illustrated by message 120, then the acknowledgement will occur with message 122 at time slot 2*n+3 and with message 124 at time slot 2*n+4. Similarly, a subsequent important MAC PDU is required to be sent to UE2 at time slot 2*n+2, shown as message 130. The acknowledgement of message 130 is performed in messages 132 and 134 which start at time slot 2*n+4 and 2*n+5 respectively.

As seen in FIG. 1, the feedback signals from the two UEs use the same uplink resources including the same frequency band, CAZAC sequence, and cyclic shift of the sequence in the time slot 2*n+5. Due to this, the eNB will have trouble distinguishing between the two feedback signals in that time slot and this will much increase the error probability. This is shown by a collision 140.

As will be appreciated by those skilled in the art, the downlink arrows of FIG. 1 represent a scheduling indication on PDCCH and transmission of the scheduled data on downlink shared channel. Hereafter in this specification, the expression that a message is sent on PDCCH is used to refer to that the scheduling indication of the message is sent on PDCCH and actual data is sent on the downlink shared channel using resources specified in the scheduling indication. Meanwhile the uplink arrows represent HARQ feedback using uplink resources indicated by the corresponding PDCCH.

Figure 2:
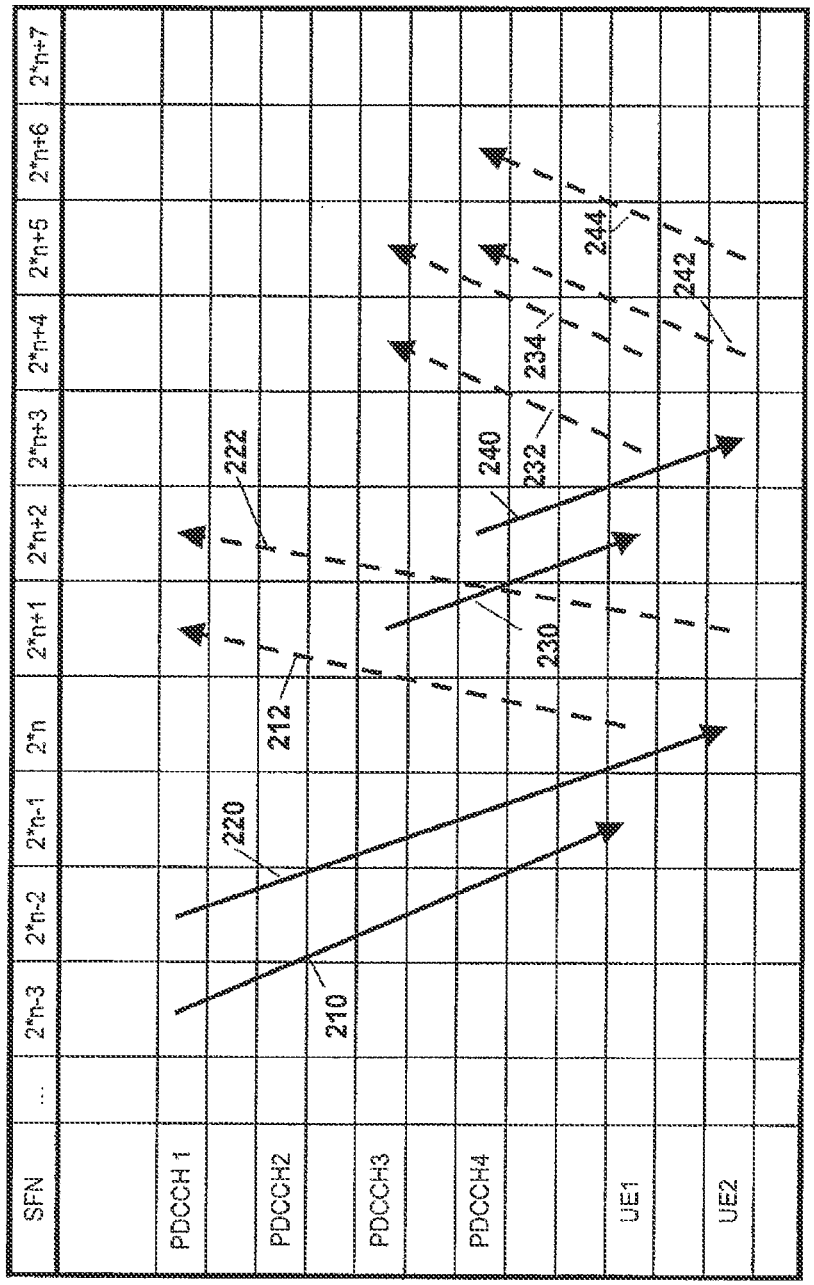
FIG. 2 is a dataflow diagram showing communications between an eNB and two UEs, where multiple channels are used for robust HARQ feedback signaling.

Various solutions to avoid collision 140 are presented. Reference is now made to FIG. 2.

In one embodiment, the eNB could schedule important PDUs with adequate intervals to avoid the collision described in FIG. 1. However, this leads to the underutilization of dedicated downlink control channels and may introduce latency when control information needs to be sent to the UEs. In order to reduce the latency, multiple downlink control channels can be reserved for multiple ACK/NACK repetitions.

In the example of FIG. 2, PDCCH3 and PDCCH4 are utilized to indicate important MAC PDU transmissions where two ACKs are acquired.

Referring to FIG. 2, eNB sends a message 210 on PDCCH1 to UE1 at time slot 2*n−3 and this is acknowledged in time slot 2*n with message 212.

Similarly, a message 220 is sent on PDCCH1 to UE2 at time slot 2*n−2 and is acknowledged in time slot 2*n+1 with message 222.

In the example of FIG. 2, both PDCCH3 and PDCCH4 are linked to uplink resources for two ACK/NACK repetitions by broadcast control information. In this example, a first message 230 is sent from PDCCH3 to UE1. This message is acknowledged with an acknowledgement 232 in time slot 2*n+3 and an acknowledgement 234 in time slot 2*n+4.

Similarly, an important MAC PDU is sent from PDCCH4 to UE2, and is shown as message 240. This is acknowledged with acknowledgements 242 and 244 which are sent in time slots 2*n+4 and 2*n+5 respectively.

As seen in FIG. 2, at time slot 2*n+5 no collision occurs since one acknowledgement, namely acknowledgement 234, is sent to the eNB using the resources indicated by PDCCH3 while the other acknowledgement, namely acknowledgement 242, is sent to the eNB using the resources indicated by PDCCH4.

In the example of FIG. 2, the selection of which physical downlink control channel to send an important MAC PDU could be determined based on the time slot in which the message needs to be sent. For example, PDCCH3 could be used in odd system frame numbers (SFNs) and PDCCH4 could be used with even SFNs, as illustrated in FIG. 2. As will be appreciated, the embodiment of FIG. 2 addresses the latency issue described above.

In certain situations, the use of two dedicated physical downlink control channels leads to system underutilization. As will be appreciated by those skilled in the art, with reference to FIG. 2, PDCCH3 can only be utilized every second time slot and similarly, PDCCH4 can only be utilized every second time slot. A further embodiment is described with reference to FIG. 3.

For an efficient single dedicated PDCCH operation, radio resources such as available cyclic shifts of the CAZAC sequence can be divided into multiple groups. For example, in the case where feedback requires two repetitions, half of the available cyclic shifts can be preconfigured to an odd system frame number and the rest can be preconfigured to an even system frame number, as shown in FIG. 3.

Specifically, as with the examples of FIG. 1 and FIG. 2, a message 310 can be sent on PDCCH1 to UE1 and responded to with acknowledgement 312.

Similarly, a message 320 can be sent on PDCCH1 to UE2 and responded to with an acknowledgement 322.

Figure 3:
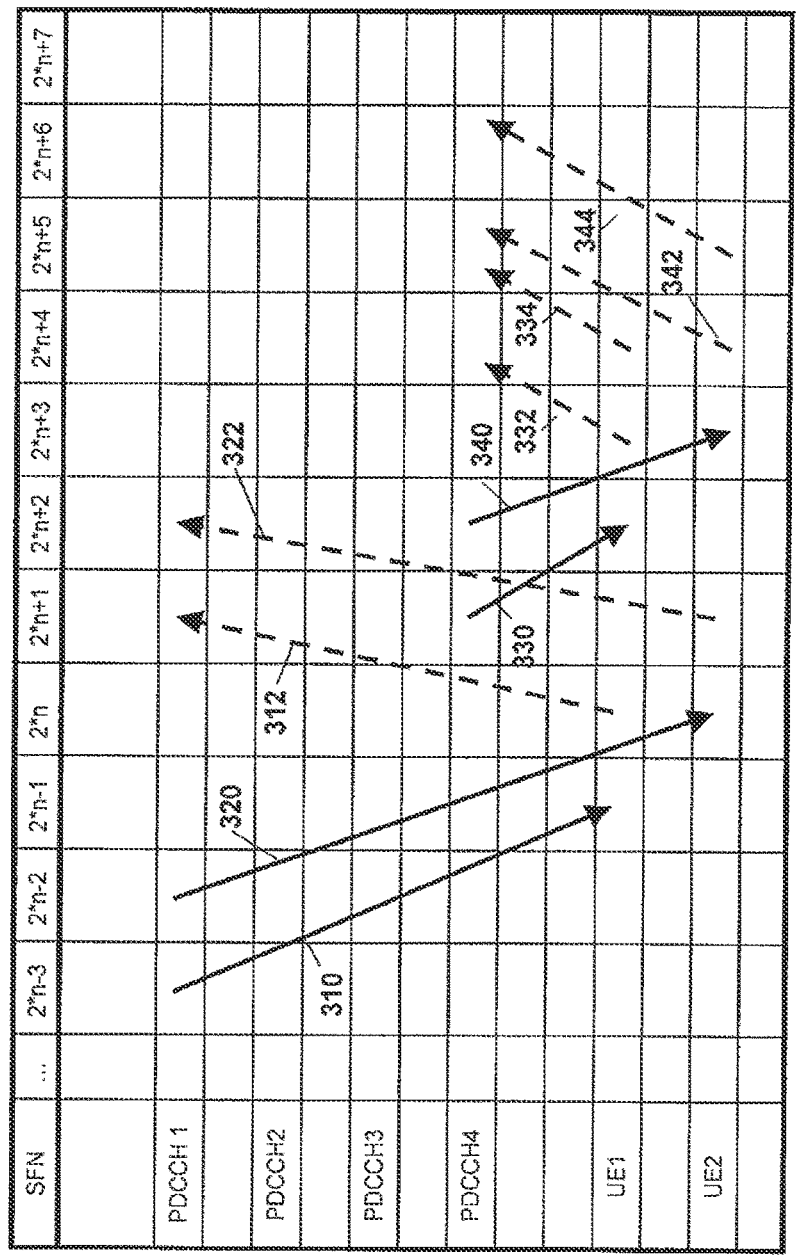
FIG. 3 is a dataflow diagram showing communications between an eNB and two UEs, where cyclic shifts are utilized to avoid collisions.

In the example of FIG. 3, only PDCCH4 is used for resources that require two or multiple ACK or NACK repetitions. In the case of a message 330 sent at system frame number 2*n+1, the acknowledgement is sent at timeframe 2*n+3 as acknowledgement 332. Similarly, the second acknowledgement 334 is sent at timeframe 2*n+4.

Since message 330 originated at a system frame number that is odd, all acknowledgements for that message could utilize a cyclic shift from the first group, for example.

Similarly, message 340 is sent from PDCCH4 to UE2 and requires two acknowledgements. These are sent as acknowledgements 342 and 344.

Since message 340 originated at an even system frame number, a cyclic shift from the second group can be applied to all acknowledgments from message 340. In this case, at timeframe 2*n+5 two acknowledgements are received by the eNB. However, acknowledgement 334 utilizes a first cyclic shift and acknowledgement 342 utilizes a second cyclic shift. In this way, the eNB is able to distinguish between the HARQ feedback resources and no collision occurs.

As will be appreciated by those skilled in the art, since the frequency of important MAC PDUs is much less than the frequency of the remaining traffic, partitioning uplink HARQ feedback resources, for example, for cyclic shifts, into multiple groups likely will cause no problems within the network.

Figure 4:
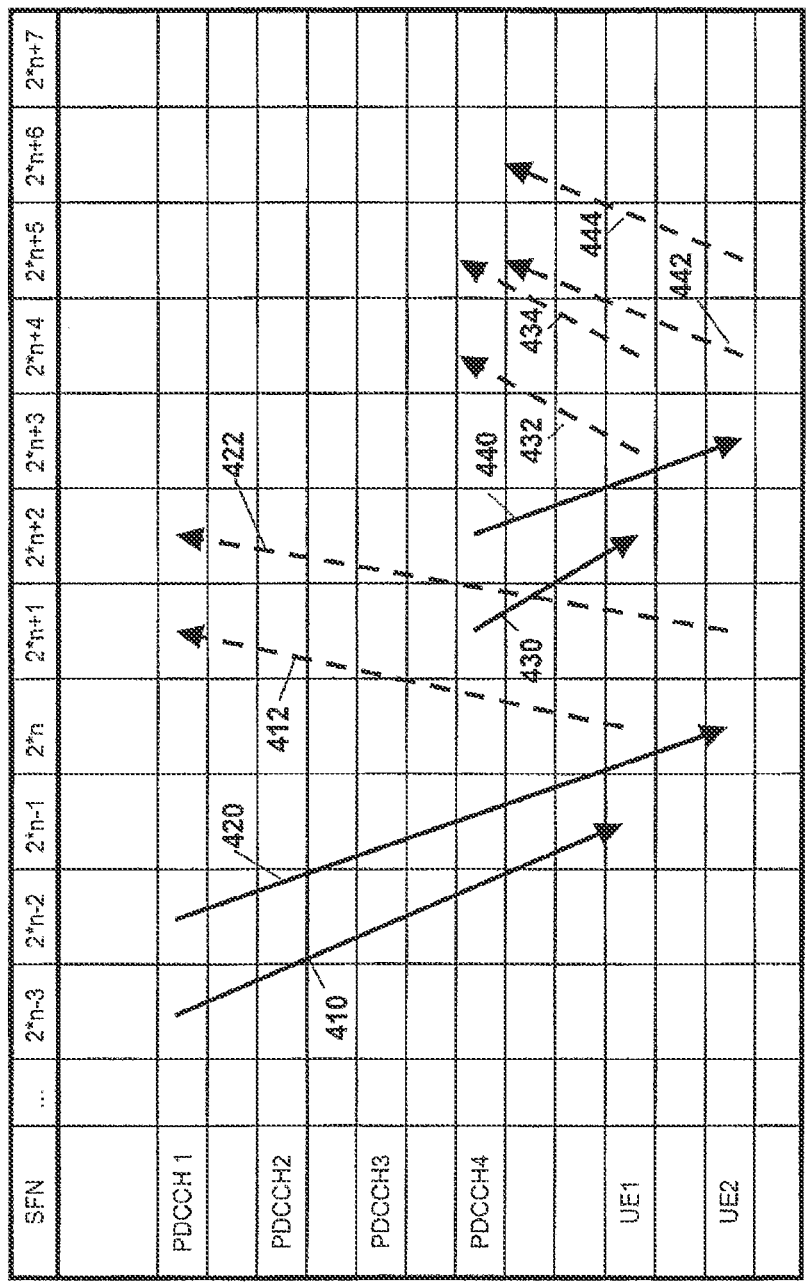
FIG. 4 is a dataflow diagram illustrating communications between an eNB and two UEs, where frequency shifting is utilized to avoid collisions.

As an alternative to partitioning cyclic shifts, a group of frequency blocks can be assigned to a dedicated PDCCH and the UE uses frequency blocks determined by the system frame number when it transmits multiple HARQ feedback. In the case of two repetitions the UE can send the HARQ feedback in one of two frequency blocks in order to avoid collisions. Reference is now made to FIG. 4.

As with FIGS. 1, 2 and 3, a message 410 is sent from PDCCH1 to UE1 and is acknowledged with acknowledgement 412. Similarly, a message 420 is sent from PDCCH1 to UE2 and is acknowledged with acknowledgement 422.

An important MAC PDU is received at the eNB and is required to be sent to UE1. This MAC PDU is sent in message 430 and is acknowledged with messages 432 and 434. Similarly, in the subsequent time slot, an important message is required to be sent to UE2 and this is sent as message 440 and is acknowledged as messages 442 and 444.

Since message 430 originates in time slot 2*n+1, which is an odd system frame number, acknowledgements for message 430 can utilize a first frequency block linked to PDCCH4. Similarly, since message 440 originates in time slot 2*n+2, which is an even system frame number, acknowledgements for message 440 can be sent in a second frequency block linked to PDCCH4. This is illustrated by acknowledgements 432 and 434 proceeding to an area near the top of PDCCH4 in FIG. 4, and acknowledgements 442 and 444 are proceeding to an area near the bottom of PDCCH4 in FIG. 4.

As will be appreciated by those skilled in the art, time slot 2*n+5 receives two HARQ feedback responses. These are acknowledgements 434 and 442. However, because message 434 uses a first frequency block and acknowledgement 442 uses a second frequency block, the eNB is able to distinguish between the two HARQ feedbacks and thus no collision occurs.

Figure 5:
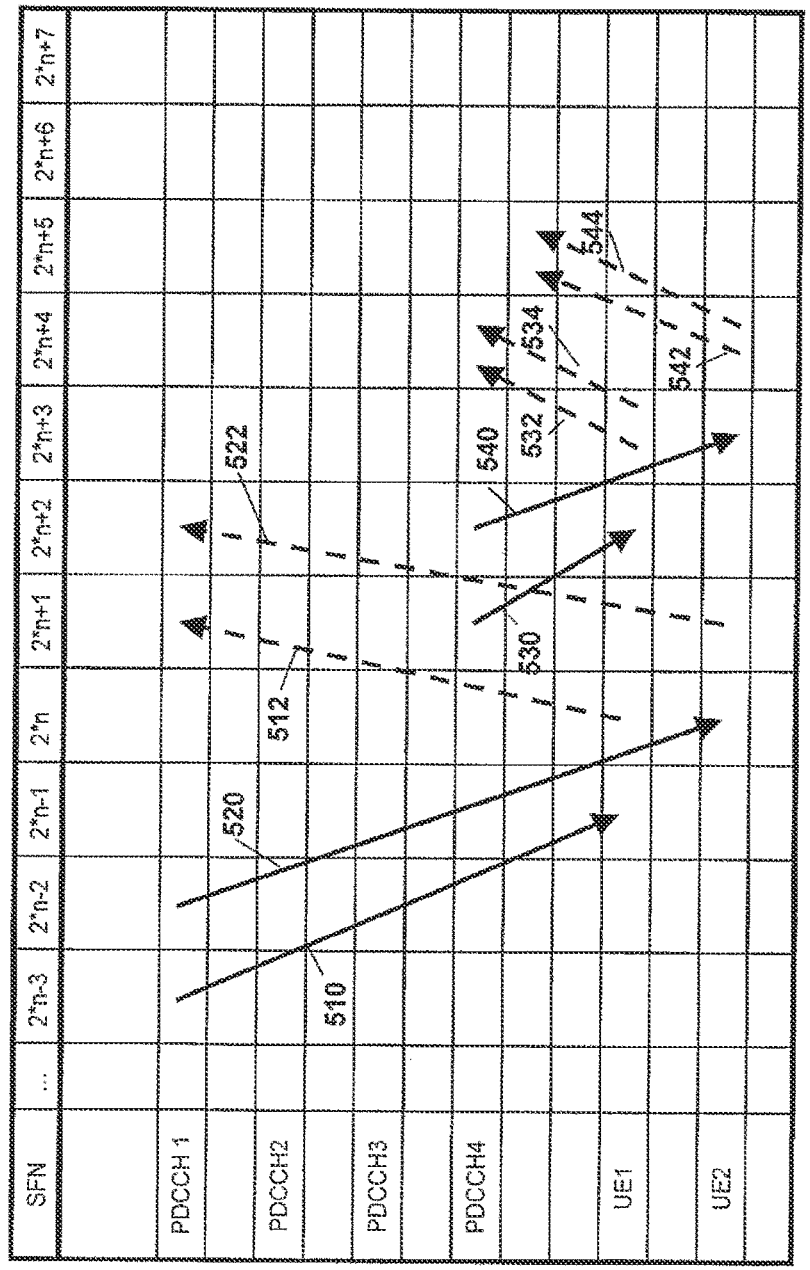
FIG. 5 is a dataflow diagram between an eNB and two UEs where cyclic shifting is used for robust signaling within the same time slot.

Reference is now made to FIG. 5. FIG. 5 shows an alternative in which two HARQ feedbacks can be sent for a message received within the same time slot. However, these feedbacks will utilize a different cyclic shift in order to be able to be distinguished by the eNB. Specifically, as with FIGS. 1 to 4, message 510 is sent on PDCCH1 to UE1 and is acknowledged with message 512.

Similarly, message 520 is sent on PDCCH1 to UE2 and is acknowledged with message 522.

An important MAC PDU needs to be sent to UE1 and is sent as message 530 in time slot 2*n+1. In the example of FIG. 5, two acknowledgements are sent within the subsequent acknowledgement time slot of 2*n+3. These are messages 532 and 534.

As will be seen from FIG. 5, messages 532 and 534 are both sent within the same time slot but utilizing a different cyclic shift and can thus be distinguished at the eNB.

In the subsequent time slot an important MAC PDU is required to be sent. The important MAC PDU is sent as message 540 on PDCCH4 and is acknowledged with feedbacks 542 and 544 (feedback repetition). Again, messages 542 and 544 are acknowledged within the same time slot and utilize a cyclic shift to enable the eNB to distinguish between the two acknowledgements. The eNB will simply combine both the acknowledgments to improve the reliability.

As will be appreciated by those skilled in the art, referring to FIG. 5, no collisions will occur between subsequent time slots when multiple acknowledgements are required, since all of the multiple acknowledgements are sent within the same time slot utilizing different cyclic shifts.

Figure 6:
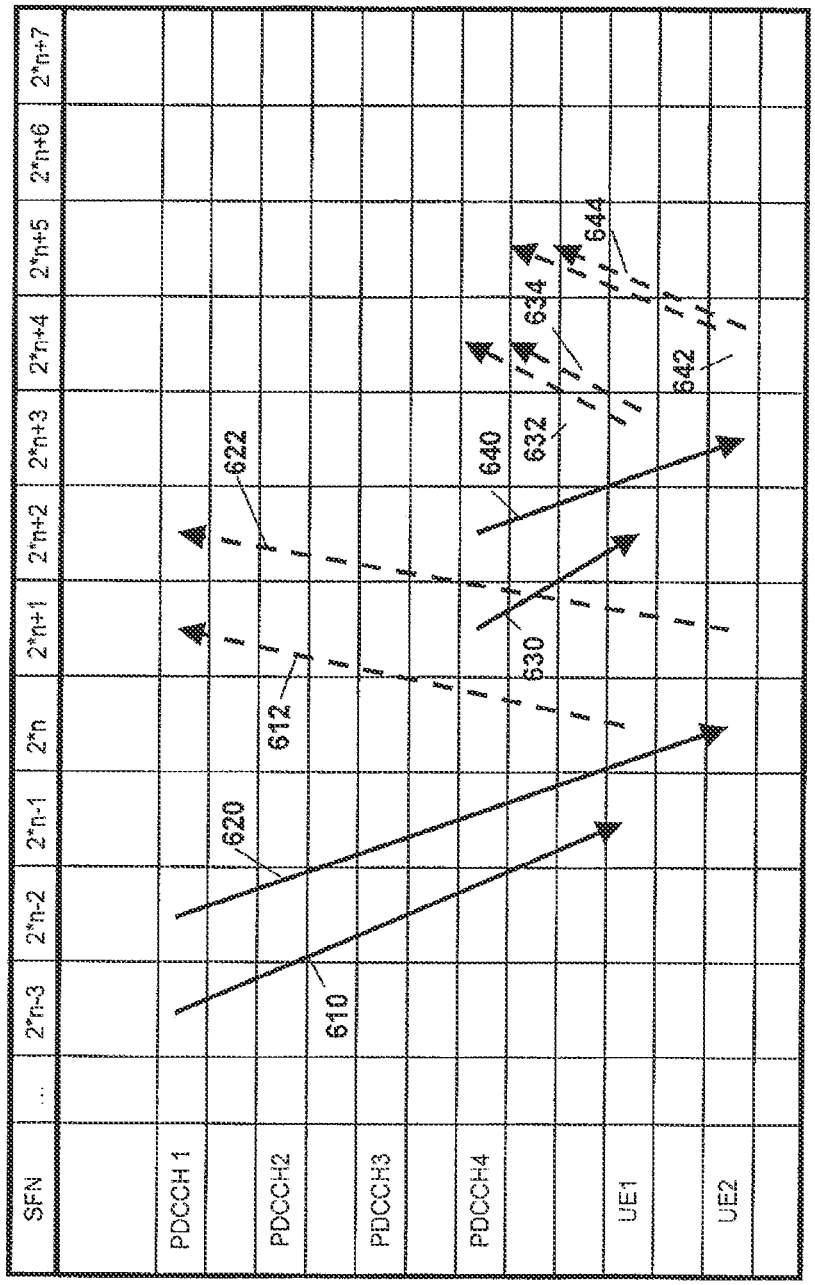
FIG. 6 is a dataflow diagram between an eNB and two UEs where frequency shifting is used for robust signaling within the same time slot.

Reference is now made to FIG. 6. FIG. 6 shows a data flow diagram in which multiple acknowledgements for an important MAC PDU are sent in the same time slot and differentiated by frequency block. Specifically, a message 610 is sent from PDCCH1 to UE1. The UE1 acknowledges the message in acknowledgement 612.

Similarly, a message 620 is sent from PDCCH1 to UE2 and is acknowledged as message 622.

A downlink MAC PDU requiring multiple HARQ feedback arrives at the eNB in time slot 2*n+1 and is sent to UE1 in message 630. UE1 acknowledges the message in time slot 2*n+3 utilizing two acknowledgement messages, namely 632 and 634, within this time slot. Acknowledgements 632 and 634 can be distinguished at the eNB based on the different frequency blocks between the two acknowledgement messages. The eNB will simply combine both the acknowledgments to improve the reliability.

Similarly, a message requiring multiple HARQ feedbacks for UE2 arrives at the eNB and is sent to UE2 in time slot 2*n+2 as shown by message 640. Message 640 is acknowledged with acknowledgements 642 and 644, which are again sent within the same time slot and differentiated at the eNB by the different frequency blocks between acknowledgements.

Figure 7:
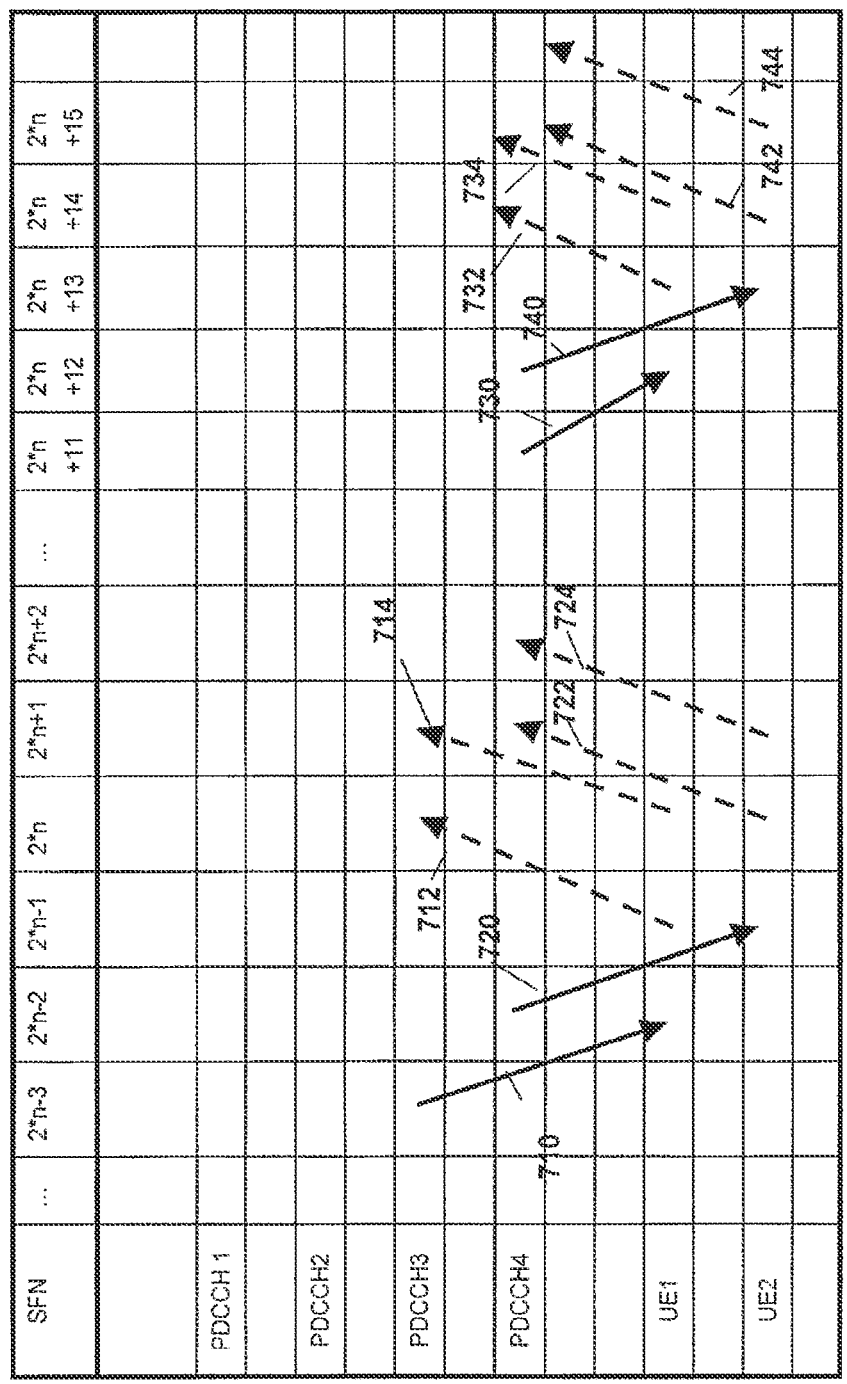
FIG. 7 illustrates a dataflow diagram between an eNB and two UEs utilizing a hybrid system in which robust signaling changes dependent on the network.

As will be appreciated by those skilled in the art, combinations of the above could be utilized depending on network conditions. For example, reference is made to FIG. 7. FIG. 7 illustrates a data flow diagram in which messages requiring multiple acknowledgements utilize various schemes for differentiation dependent on network conditions or other factors.

In FIG. 7, a message for UE1 arrives which requires multiple acknowledgements. Under the initial differentiation scheme of FIG. 7, the message 710 is sent on PDCCH3 to UE 1 and acknowledgements 712 and 714 are sent back from UE1 to the eNB. A further message requiring multiple feedbacks arrives at the eNB for UE2 and is sent in the subsequent time slot to UE2 from PDCCH4 as message 720. Message 720 is acknowledged with messages 722 and 724. As is seen in time slot 2*n+1 multiple acknowledgements are being sent back to the eNB within the same time slot but because UE 1 utilizes resources indicated by PDCCH3 and UE2 utilizes resources indicated by PDCCH4, no collision occurs.

Subsequent to acknowledgement 722 being sent from UE2, the eNB determines that network traffic has increased and the use of dedicated PDCCHs for multiple acknowledgements should be reduced. In this regard, the eNB may send a message on a broadcast channel that acknowledgements should be performed based on a differentiation factor such as a cyclic shift or a frequency block. In the example of FIG. 7, a frequency block is utilized.

A further message 730 is received by the eNB and is sent on PDCCH4 to UE1 in time slot 2*n+11. A message 740 is received by the eNB and is sent on PDCCH4 to UE2 in time slot 2*n+12. Both messages 730 and 740 require multiple HARQ feedbacks.

Acknowledgement 732 is sent from UE1 to the eNB in time slot 2*n+13 utilizing a first frequency block based on the message broadcast from the eNB in the broadcast channel. Similarly, acknowledgement 734 is sent from UE1 to the eNB in time slot 2*n+14 utilizing the same frequency as acknowledgement 732.

Acknowledgement 742 is sent from UE2 to the eNB in time slot 2*n+14 utilizing a second frequency block based on the message sent from the eNB in the broadcast channel. Similarly, acknowledgement 744 is sent from UE2 to the eNB in time slot 2*n+15 utilizing the second frequency block.

Since acknowledgements 734 and 742 are both received within time slot 2*n+15, a collision would occur without a differentiating factor between the acknowledgements. However, in this case, acknowledgement 734 is sent on the first frequency block and acknowledgement 742 is sent on the second frequency block, thus allowing the eNB to distinguish between the acknowledgements.

Differentiating factors, as used herein, refer to techniques that allow the eNB to distinguish between acknowledgement messages received at the same time slot. These include, but are not limited to, using different physical downlink control channels for sending messages that require multiple acknowledgements, specifying different cyclic shifts or specifying different frequency blocks.

In one embodiment, the differentiating factor is utilized based on the time slot that the initial message is sent in. For example, in the case where two acknowledgements are required, messages sent in odd time slots could be responded to the eNB, utilizing a first cyclic shift or utilizing a first frequency block. Messages sent in even time slots could be responded to the eNB, utilizing a second cyclic shift or utilizing a second frequency block.

In a further embodiment, the differentiating factor used in the response could be based on the acknowledgement number. Specifically, in the above it was described that a message sent in an even time slot requiring two acknowledgements would have both acknowledgements sent utilizing the second variation of the differentiating factor, such as the second cyclic shift. In the further embodiment, this could be replaced by having the response to any message require the first acknowledgement to utilize a first variation of the differentiating factor and the second acknowledgement to utilize a variation of the second differentiating factor. For example, all first acknowledgements utilize a first frequency block and all second acknowledgements utilize a second frequency block.

Figure 10:
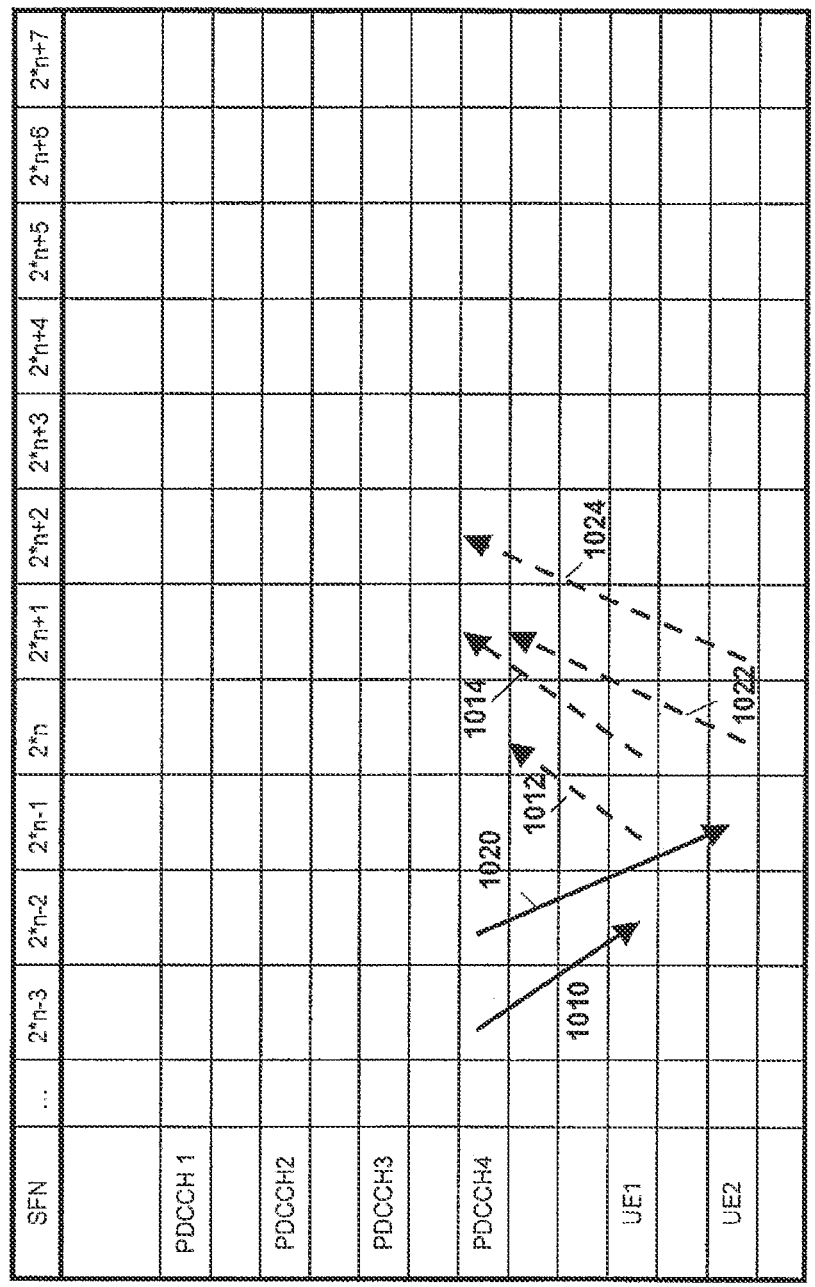
FIG. 10 is a dataflow diagram showing robust signaling utilizing an acknowledgement scheme dependent on the order of the acknowledgement message.

As will be seen by those skilled in the art, the above will still avoid collisions within the same time slot for acknowledgements. Specifically, referring to FIG. 10, in the case where the differentiating factor is a frequency block, a message 1010, which requires two acknowledgements is sent in time slot 2*n-3. A first acknowledgement 1012 is sent in time slot 2*n-1 and utilizes a first frequency block. A second acknowledgement 1014 in response to message 1010 is sent in time slot 2*n and utilizes a second frequency block.

Message 1020, which requires multiple acknowledgements, is sent on PDCCH4 to UE2 in time slot 2*n-2 and is acknowledged by acknowledgement 1022 in time slot 2*n utilizing a first frequency block and by acknowledgement 1024 in time slot 2*n+1 utilizing a second frequency block.

As can be seen from the above time slot 2*n has two acknowledgements sent to the eNB. However, acknowledgement 1014 utilizes the second frequency block and acknowledgement 1022 utilizes the first frequency block.

Thus, instead of requiring all acknowledgements for a message to utilize the same variation in the differentiating factor, acknowledgements to a message must utilize the same progression in the variations in differentiating factor to avoid collisions.

Figure 8:
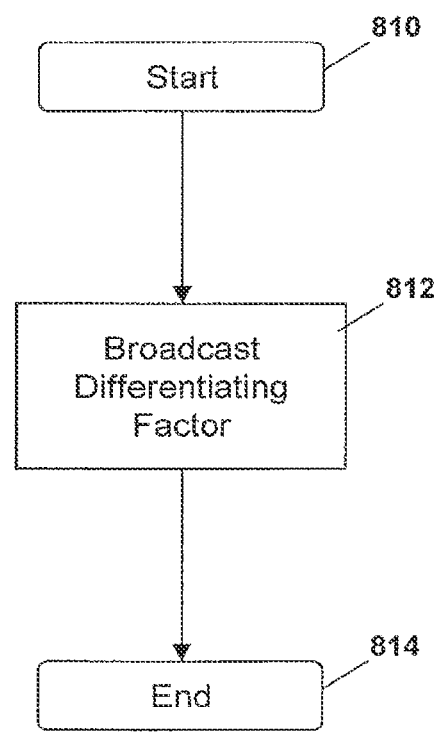
FIG. 8 is a flow chart of an exemplary method in accordance with the present disclosure from an eNB perspective.

Reference is now made to FIG. 8. FIG. 8 illustrates a method from the eNB perspective for setting the differentiating factor. Specifically, the process starts at step 810 and proceeds to step 812 in which the differentiating factor is broadcast to the UEs. As will be appreciated by those skilled in the art, the broadcast may occur over any broadcast channel or may be a dedicated message to UEs being serviced by the eNB. The process then ends at step 814.

Figure 9:
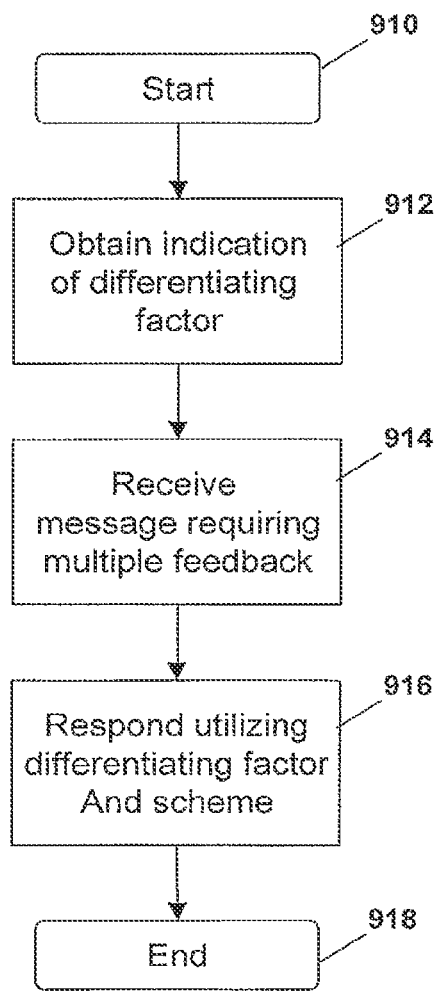
FIG. 9 is a flow chart of an exemplary method in accordance with the present disclosure from the UE perspective.

Reference is now made to FIG. 9. FIG. 9 illustrates a flow diagram for a method from a UE perspective. The process starts at step 910 and proceeds to step 912 in which the UE obtains an indication of the differentiating factor that it should use. Step 912 could include the differentiating factor that is broadcast on a broadcast channel, a dedicated message sent to the UE or a preconfigured differentiating factor that is either built-in to the UE or provisioned to the UE. In the latter cases, changing the differentiating factor is difficult.

The process then proceeds to step 914 in which the UE receives a message that requires multiple acknowledgements. Such a message includes, but is not limited to, a MAC control PDU or a MAC data PDU having control information in its header.

The process then proceeds to step 916 in which acknowledgements are sent to the eNB utilizing the differentiating factor in accordance with a predefined scheme. For example, differentiating factors include different cyclic shifts, or different frequency blocks which are indicated by PDCCHs. The scheme to utilize these differentiating factors could include a time based scheme where all acknowledgements for a message sent in a particular time slot utilize the same differentiating factor. For example, all acknowledgements to messages sent in odd time slots could use a first frequency block.

Alternatively, the scheme could include the use of a differentiating factor based on the sequence of acknowledgements. For example, every first acknowledgement could utilize the first frequency block and every second acknowledgement could utilize the second frequency block.

The process then proceeds to step 918 and ends.

As will be appreciated by those skilled in the art, the method of FIG. 9 avoids collisions by allowing the eNB to distinguish or differentiate between acknowledgements received in the same time slot. Further latency issues are reduced, and in the case of cyclic or frequency shifting, network resources are more fully utilized.

The above examples use the requirement of two acknowledgements for certain MAC PDUs. However, the above techniques can be expanded for messages requiring more than two acknowledgements. In this case, the number of dedicated physical downlink control channels could equal the number of acknowledgements required, the number of cyclic shift groups could equal the number of acknowledgements required or the number of frequency blocks could equal the number of acknowledgements required.

In a further expansion to the above, various differentiating factors could be utilized together in order to increase the number of distinguishing features for acknowledgements while not placing undue burdens on the network. Specifically, a network may be limited to the number of dedicated physical downlink control channels that can be utilized for multiple acknowledgement messages, the number of cyclic shifts that can be distinguished, or the number of frequency shifts that can be distinguished.

Thus, a system requiring more than two acknowledgements could combine frequency blocks and cyclic shifts, physical downlink control channel and frequency blocks, or physical downlink control channel and cyclic shifts. An example in which four acknowledgements are required could utilize a first cyclic shift and first frequency shift in a first time slot, the first cyclic shift and second frequency shift in a second time slot, the second cyclic shift and a first frequency shift in a third time slot and the second cyclic shift and second frequency shift in the fourth time slot. Various alternatives to the above would be evident to those skilled in the art having regard to the present disclosure. The present disclosure is not meant to limit the combination of differentiating factors to any specific grouping.

The above can be implemented on any UE and eNB. An exemplary UE is described with reference to FIG. 11. The present disclosure is not meant to be limited to the embodiment of FIG. 11, however, and any UE can be utilized.

Figure 11:
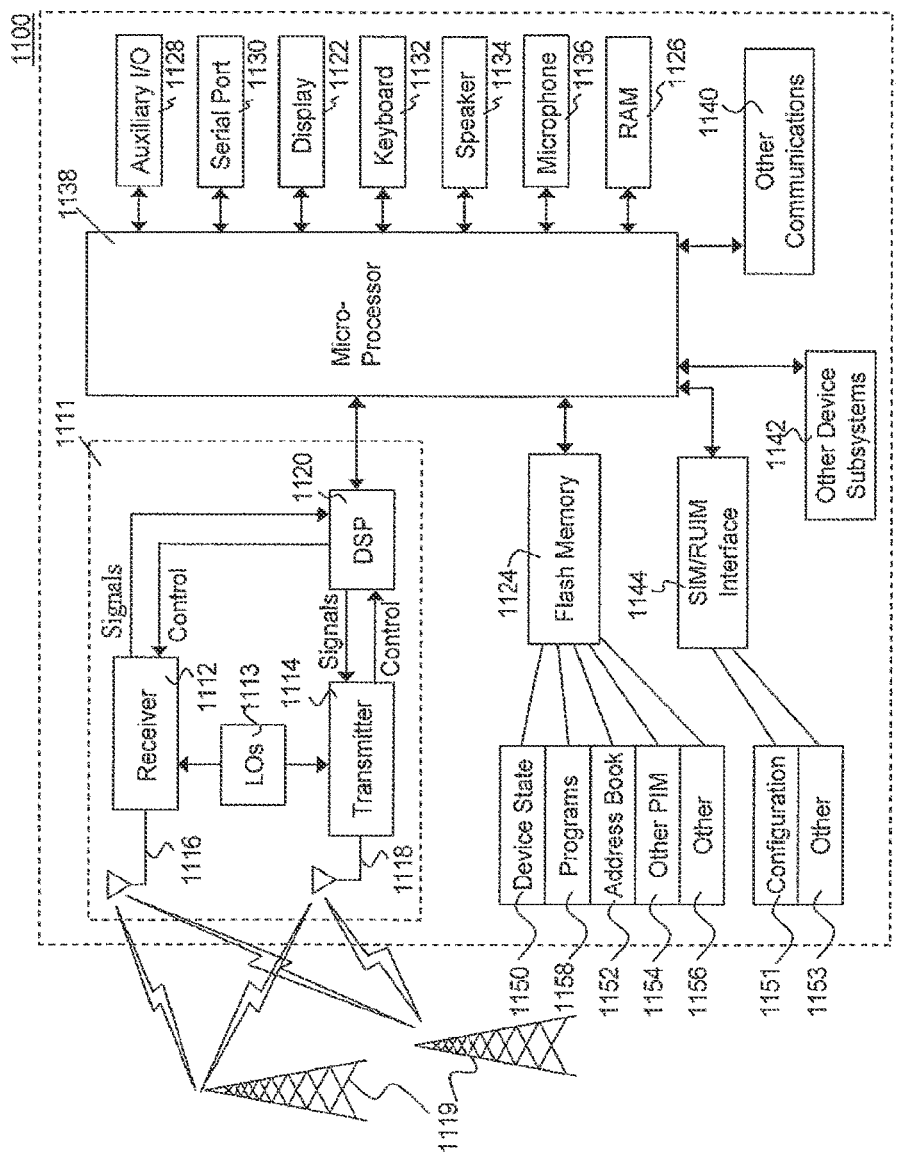
FIG. 11 is a block diagram of an exemplary mobile device apt to be used with the present disclosure.

FIG. 11 is a block diagram illustrating user equipment apt to be used with preferred embodiments of the apparatus and method of the present application. User equipment 1100 is preferably a two-way wireless communication device having at least voice and data communication capabilities. User equipment 1100 preferably has the capability to communicate with other computer systems on the Internet.

User equipment 1100 incorporates a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate.

An LTE user equipment may require a removable user identity module (RUIM) or a subscriber identity module (SIM) card in order to operate on a network. The SIM/RUIM interface 1144 is normally similar to a card-slot into which a SIM/RUIM card can be inserted and ejected like a diskette or PCMCIA card. The SIM/RUIM card can have approximately 64 K of memory and hold many key configurations 1151, and other information 1153 such as identification, and subscriber related information.

When required network registration or activation procedures have been completed, user equipment 1100 may send and receive communication signals over a network 1119. As illustrated in FIG. 11, network 1119 can consist of multiple base stations communicating with the user equipment.

Signals received by antenna 1116 through communication network 1119 are input to receiver 1112, which may perform such common receiver functions as signal amplification, frequency down conversion, filtering, channel selection and the like, and in the example system shown in FIG. 11, analog to digital (ND) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

User equipment 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the user equipment. A predetermined set of applications that control basic operations, including at least data and voice communication applications for example, will normally be installed on user equipment 1100 during manufacturing. Other applications could be installed subsequently or dynamically.

A preferred software application may be a personal information manager (PIM) application having the ability to organize and manage data items relating to the user of the user equipment such as, but not limited to, e-mail, calendar events, voice mails, appointments, and task items. Naturally, one or more memory stores would be available on the user equipment to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the user equipment user's corresponding data items stored or associated with a host computer system. Further applications may also be loaded onto the user equipment 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the user equipment 1100.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128.

A user of user equipment 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of user equipment 1100 is similar, except that received signals would preferably be output to a speaker 1134 and signals for transmission would be generated by a microphone 1136. Alternative voice or audio I/O subsystems, such as a voice message recording subsystem, may also be implemented on user equipment 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type user equipment for which synchronization with a user's desktop computer (not shown) may be desirable, but is an optional device component. Such a port 1130 would enable a user to set preferences through an external device or software application and would extend the capabilities of user equipment 1100 by providing for information or software downloads to user equipment 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the mobile device to a computer to act as a modem.

Other communications subsystems 1140, such as a short-range communications subsystem, is a further optional component which may provide for communication between user equipment 1100 and different systems or devices, which need not necessarily be similar devices. For example, the subsystem 1140 may include an infrared device and associated circuits and components or a Bluetooth™ communication module to provide for communication with similarly enabled systems and devices.

Figure 12:
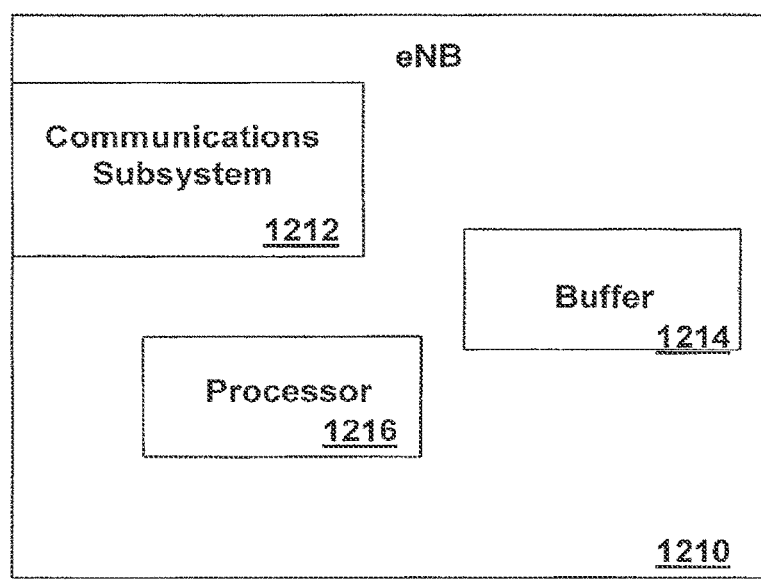
FIG. 12 is a block diagram of the simplified eNB apt to be used with the present disclosure.

Referring to FIG. 12, a simplified enhanced Node B 1210 is provided. Enhanced Node B 1210 includes a communications subsystem 1212 for communication with user equipment and further for receiving data from a network.

Enhanced Node B further includes a buffer 1214 to store data that is to be passed to a UE.

Enhanced Node B further includes a processor 1216 adapted to initiate signaling and process responses in accordance with the embodiment of FIGS. 1 to 10 herein.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods.

The invention claimed is:

1. A method performed by a user equipment to provide acknowledgement (ACK) or negative acknowledgement (NACK) feedback regarding a downlink transmission, the method comprising:
 upon receipt of the downlink transmission:
  transmitting, by the user equipment, a first ACK/NACK feedback response corresponding to the downlink transmission in a first subframe using a first cyclic shift, and transmitting, by the user equipment, a plurality of additional ACK/NACK feedback responses corresponding to the same downlink transmission, each of the plurality of additional ACK/NACK feedback responses corresponding to the same downlink transmission being transmitted in a respective subframe using a respective cyclic shift different from the first cyclic shift used by the first ACK/NACK response corresponding to the same downlink transmission.

2. The method of claim 1, wherein each of the plurality of additional ACK/NACK feedback responses is a repetition of the first ACK/NACK feedback response.

3. The method of claim 1, wherein each of the respective subframes is a subframe following the first subframe.

4. The method of claim 1, wherein the first ACK/NACK feedback response is transmitted using a first uplink transmission resource, and the first uplink transmission resource is determined based on a location of a physical downlink control channel.

5. The method of claim 1, wherein the first ACK/NACK feedback response is transmitted using a first uplink transmission resource, and the first uplink transmission resource is determined based on an index associated with a physical downlink control channel.

6. The method of claim 1, wherein the downlink transmission is a single transmission of a Medium Access Control (MAC) Protocol Data Unit (PDU).

7. A user equipment comprising:
a receiver configured to receive a downlink transmission; and
a transmitter configured to provide acknowledgement (ACK) or negative acknowledgement (NACK) feedback upon receipt of the downlink transmission by transmitting a first ACK/NACK feedback response corresponding to the downlink transmission in a first subframe using a first cyclic shift, and transmitting a plurality of additional ACK/NACK feedback responses corresponding to the same downlink transmission, each of the plurality of additional ACK responses corresponding to the same downlink transmission being transmitted in a respective subframe using a respective cyclic shift different from the first cyclic shift used by the first ACK/NACK response corresponding to the same downlink transmission.

8. The user equipment of claim 7, wherein each of the plurality of additional ACK/NACK feedback responses is a repetition of the first ACK/NACK feedback response.

9. The user equipment of claim 7, wherein the first ACK/NACK feedback response is transmitted using a first uplink transmission resource, and the first uplink transmission resource is determined based on a location of a physical downlink control channel.

10. The user equipment of claim 7, wherein the first ACK/NACK feedback response is transmitted using a first uplink transmission resource, and the first uplink transmission resource is determined based on an index associated with a physical downlink control channel.

11. A method performed by a user equipment for providing acknowledgement (ACK) or a negative acknowledgement (NACK) feedback, the method comprising:
transmitting, by a transmitter of the user equipment, a first ACK/NACK response corresponding to a downlink transmission, the first ACK/NACK response transmitted in a first subframe using a first cyclic shift; and
repeating transmission, by the transmitter of the user equipment, of additional ACK/NACK responses corresponding to the same downlink transmission, each of the plurality of additional ACK/NACK responses corresponding to the same downlink transmission being transmitted in a respective subframe using a respective cyclic shift different from the first cyclic shift used by the first ACK/NACK response corresponding to the same downlink transmission.

12. A user equipment for providing acknowledgement (ACK) or a negative acknowledgement (NACK) feedback, the user equipment comprising:
a receiver configured to receive a downlink transmission; and
a transmitter configured to transmit a first ACK/NACK response corresponding to the downlink transmission, the first ACK/NACK response transmitted in a first subframe using a first cyclic shift, and repeat transmission of additional ACK/NACK responses corresponding to the same downlink transmission, each of the plurality of additional ACK/NACK responses corresponding to the same downlink transmission being transmitted in a respective subframe using a respective cyclic shift different from the first cyclic shift used by the first ACK/NACK response corresponding to the same downlink transmission.

13. A method performed by a user equipment to provide acknowledgement (ACK) or negative acknowledgement (NACK) feedback regarding a downlink transmission, the method comprising:
upon receipt of the downlink transmission:
transmitting, by the user equipment, a first ACK/NACK feedback response corresponding to the downlink transmission in a first subframe using a first cyclic shift;
transmitting, by the user equipment, a second ACK/NACK feedback response corresponding to the same downlink transmission in a second subframe using a second cyclic shift different from the first cyclic shift; and
transmitting, by the user equipment, a third ACK/NACK feedback response corresponding to the same downlink transmission in a third subframe using the second cyclic shift, wherein the second ACK/NACK feedback response and third ACK/NACK feedback response are repetitions of the first ACK/NACK response.

14. A user equipment, comprising:
a receiver configured to receive a downlink transmission; and
a transmitter configured to provide acknowledgement (ACK) or negative acknowledgement (NACK) feedback upon receipt of the downlink transmission by transmitting a first ACK/NACK feedback response corresponding to the downlink transmission in a first subframe using a first cyclic shift, transmitting a second ACK/NACK feedback response corresponding to the same downlink transmission in a second subframe using a second cyclic shift different from the first cyclic shift, and transmitting a third ACK/NACK feedback response corresponding to the same downlink transmission in a third subframe using the second cyclic shift, wherein the second ACK/NACK feedback response and third ACK/NACK feedback response are repetitions of the first ACK/NACK response.

* * * * *